United States Patent
Al Mehthel et al.

(10) Patent No.: US 11,306,443 B2
(45) Date of Patent: Apr. 19, 2022

(54) POLYMER PANELS FOR WALKWAY AND PAVING

(71) Applicant: SAUDI ARABIAN OIL COMPANY, Dhahran (SA)

(72) Inventors: Mohammed Al Mehthel, Yamamah (SA); Waseem Ahmad Abdur Rahim Khatri, Dhahran (SA); Saleh Alwehaiby, Dammam (SA); Oscar Daniel Salazar Vidal, Dhahran (SA); Mirza Mansoor Baig, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 26 days.

(21) Appl. No.: 16/915,789

(22) Filed: Jun. 29, 2020

(65) Prior Publication Data
US 2021/0404124 A1 Dec. 30, 2021

(51) Int. Cl.
*E01C 5/00* (2006.01)
*E01C 5/20* (2006.01)
*E01C 15/00* (2006.01)
*E01C 11/24* (2006.01)

(52) U.S. Cl.
CPC ............... *E01C 5/20* (2013.01); *E01C 5/001* (2013.01); *E01C 11/24* (2013.01); *E01C 15/00* (2013.01); *E01C 2201/12* (2013.01); *E01C 2201/20* (2013.01)

(58) Field of Classification Search
CPC . E01C 5/001; E01C 5/20; E01C 11/24; E01C 15/00; E01C 2201/12; E01C 2201/20
USPC .......................................... 404/17–31, 72–75
See application file for complete search history.

(56) References Cited

U.S. PATENT DOCUMENTS

| | | | |
|---|---|---|---|
| 3,273,862 A | 9/1966 | Miller | |
| 3,611,729 A * | 10/1971 | Stark | E01C 13/02 405/49 |
| 4,263,351 A | 4/1981 | Kazama et al. | |
| 4,572,700 A * | 2/1986 | Mantarro | E01C 11/225 210/486 |
| 5,118,547 A | 6/1992 | Chen | |
| 5,250,340 A * | 10/1993 | Bohnhoff | E01C 9/004 428/99 |
| 5,292,130 A * | 3/1994 | Hooper | A63B 69/3661 15/216 |
| 5,826,382 A | 10/1998 | Elsasser et al. | |
| 7,014,390 B1 * | 3/2006 | Morris | E02B 11/005 405/36 |

(Continued)

FOREIGN PATENT DOCUMENTS

CN 107794820 A 3/2018

*Primary Examiner* — Raymond W Addie
(74) *Attorney, Agent, or Firm* — Bracewell LLP; Constance G. Rhebergen; Linda L. Morgan

(57) ABSTRACT

Embodiments provide a polymeric walkway for mitigating surface water runoff and a method for constructing the same. A polymeric walkway module is secured to a pre-conditioned ground. The polymeric walkway module includes an upper panel, a lower panel, and a plurality of spacers. The upper panel includes a plurality of perforations. The plurality of spacers is positioned between the upper panel and the lower panel defining a hollow space. Surface water permeates through the plurality of perforations and occupies the hollow space during the surface water runoff.

24 Claims, 5 Drawing Sheets

(56) References Cited

U.S. PATENT DOCUMENTS

| | | | |
|---|---|---|---|
| 7,131,788 B2* | 11/2006 | Ianniello | E01C 3/00 |
| | | | 405/50 |
| 7,331,147 B2 | 2/2008 | Kalisiak et al. | |
| 7,344,334 B2 | 3/2008 | Thorkelson | |
| 7,722,287 B2* | 5/2010 | Swank | A63B 6/00 |
| | | | 404/73 |
| 8,161,711 B2 | 4/2012 | Steed et al. | |
| 8,282,310 B2* | 10/2012 | White | E01C 3/06 |
| | | | 404/18 |
| 8,464,490 B2 | 6/2013 | Rapaz | |
| 8,790,037 B2* | 7/2014 | Culleton | E01C 3/06 |
| | | | 404/29 |
| 8,807,865 B1* | 8/2014 | Modrono | E01C 5/22 |
| | | | 404/34 |
| 8,920,066 B1 | 12/2014 | Meyers | |
| 9,567,714 B2* | 2/2017 | Sawyer | E04F 15/02194 |
| 9,790,646 B2* | 10/2017 | Sawyer | E01C 13/02 |
| 10,030,337 B2 | 7/2018 | Kim | |
| 10,626,561 B2* | 4/2020 | Riccobene, Jr. | E01C 11/225 |
| 2004/0156679 A1* | 8/2004 | Jenkins | E01C 13/02 |
| | | | 404/76 |
| 2006/0285920 A1* | 12/2006 | Gettig | E01C 13/045 |
| | | | 404/31 |
| 2007/0258765 A1 | 11/2007 | Coyle et al. | |
| 2009/0188172 A1* | 7/2009 | DuCharme | E04D 13/0477 |
| | | | 52/11 |
| 2014/0161525 A1 | 6/2014 | Smith | |
| 2021/0047788 A1* | 2/2021 | Conrad | E01C 11/225 |
| 2021/0062435 A1* | 3/2021 | van Raam | E01C 13/02 |

* cited by examiner

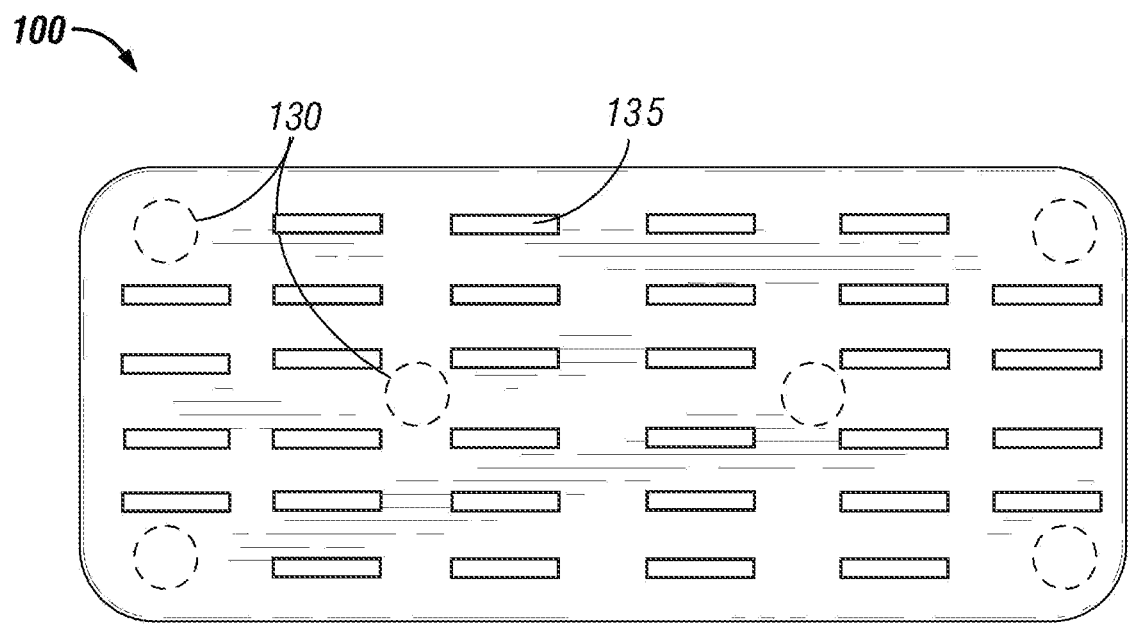
FIG. 1
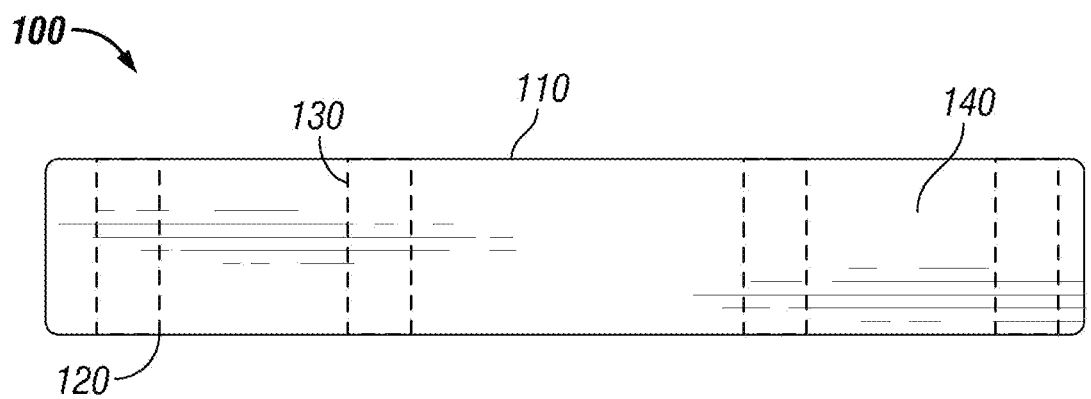
FIG. 2A
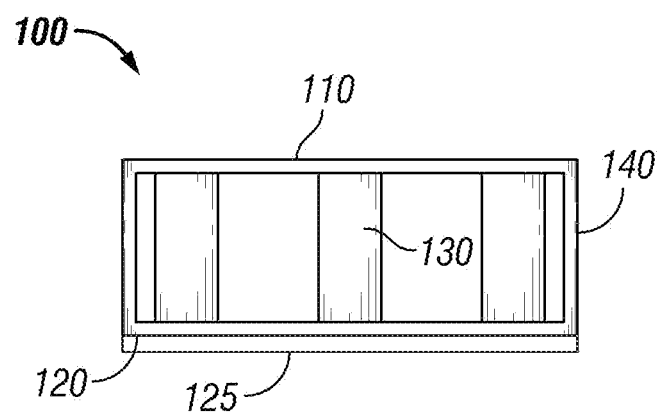

POLYMER PANELS FOR WALKWAY AND PAVING

BACKGROUND

Field of the Disclosure

Embodiments of the disclosure generally relate to walkways and paving. More specifically, embodiments of the disclosure relate to a polymeric walkway module for use in walkways and paving.

Description of the Related Art

High traffic volume roads, on which automobiles frequently travel, are typically paved using asphalt or concrete. Low traffic volume roads, such as sidewalks, walkways, bicycle-only roads, and parking lots are paved using asphalt, concrete, gravel, crushed stones, or synthetic resins in order to reduce paving costs. However, using asphalt or concrete for low traffic volume roads can result in increased maintenance costs due to periodically removing and replacing damaged sections of such roads. In addition, asphalt or concrete-based roads do not allow surface water to permeate through such roads into the soil-based ground positioned below. Because of the impermeability of the asphalt or concrete-based roads, any surface water contacting the low traffic volume road would necessarily increase the amount of surface water that flows down the street, which must be treated with a mass scale water runoff system. In addition, paving and demolishing asphalt or concrete-based roads are not time-efficient and require mass scale equipment. Gravel or crushed stones provide ample water permeability to low traffic volume roads; however, these materials can be unevenly piled up or broken by pedestrians, cyclists, and motorists travelling over such roads. In addition, soil can be accumulated in pores created by the gravel or crushed stones, reducing the water permeability of such gravel or crushed stone-based roads. Synthetic resin materials have excellent corrosion resistance and abrasion resistance. However, these materials do not necessarily reduce paving costs due to the cost of manufacturing.

SUMMARY

Embodiments of the disclosure generally relate to walkways and paving. More specifically, embodiments of the disclosure relate to a polymeric walkway module for use in walkways and paving.

Embodiments of the disclosure provide a method for constructing a walkway for mitigating surface water runoff. The method includes the step of conditioning a ground serving as a base where a walkway module is to be secured. The ground is a well-graded soil. The method includes the step of securing the walkway module to the ground. The walkway module includes an upper panel, a lower panel, and a plurality of spacers. The upper panel is substantially rectangular and includes a plurality of perforations. The lower panel has dimensions substantially similar to the upper panel and is placed vertically above and in parallel with the upper panel. The plurality of spacers is positioned between the upper panel and the lower panel such that a hollow space is defined. Surface water permeates through the plurality of perforations and occupies the hollow space. The plurality of spacers is positioned parallel to a longitudinal direction of the walkway module such that water flow is not obstructed during the surface water runoff.

In some embodiments, the walkway module includes a polymer such as polypropylene, polyethylene, polycarbonate, polyurethane, ethylene-vinyl acetate, and combinations of the same. In some embodiments, the polymer includes virgin polymers, recycled polymers, and combinations of the same. In some embodiments, the upper panel is molded monolithically with one or more of the lower panel and the plurality of spacers such that the walkway module forms a single piece. In some embodiments, the ground has a slope ranging between 1% and 3%. In some embodiments, the walkway module has a longitudinal dimension ranging between 0.8 meters (m) and 2 m, a lateral dimension ranging between 0.8 m and 2 m, and a height ranging between 5 centimeters (cm) and 20 cm. In some embodiments, the walkway module has a longitudinal-to-lateral dimension ratio ranging between 1 and 2. In some embodiments, the walkway module further includes one or more side panels. The one or more side panels are placed on any of four sides of the walkway module. In some embodiments, the walkway module further includes a soft material layer adhered to a bottom of the lower panel. The soft material layer is in contact with the ground and is configured to self-level the walkway module. In some embodiments, the soft material layer includes plastomers, rubber, thermoplastic elastomers, and combinations of the same. In some embodiments, a total surface area of the plurality of perforations is less than 25% of a surface area of the upper panel. In some embodiments, the walkway module further includes anti-skidding means applied to a top surface of the upper panel. In some embodiments, the securing step includes the step of applying a cementitious layer on the ground. The securing step includes the step of placing the walkway module on the cementitious layer while the cementitious layer is plastic. The securing step includes the step of allowing the cementitious layer to harden such that the cementitious layer adheres to both the ground and the walkway module. In some embodiments, the cementitious layer has a thickness ranging between 2.5 cm and 5 cm.

Embodiments of the disclosure also provide a walkway for mitigating surface water runoff. The walkway includes a pre-conditioned ground and a walkway module. The pre-conditioned ground serves as a base where a walkway module is to be secured onto. The pre-conditioned ground is a well-graded soil. The walkway module is secured to the pre-conditioned ground. The walkway module includes an upper panel, a lower panel, and a plurality of spacers. The upper panel is substantially rectangular and includes a plurality of perforations. The lower panel has dimensions substantially similar to the upper panel and is placed vertically above and in parallel with the upper panel. The plurality of spacers is positioned between the upper panel and the lower panel such that a hollow space is defined. Surface water is configured to permeate through the plurality of perforations and occupies the hollow space. The plurality of spacers is positioned parallel to a longitudinal direction of the walkway module such that water flow is not obstructed during the surface water runoff. The walkway module includes a polymer such as polypropylene, polyethylene, polycarbonate, polyurethane, ethylene-vinyl acetate, and combinations of the same.

In some embodiments, the polymer includes virgin polymers, recycled polymers, and combinations of the same. In some embodiments, the upper panel is molded monolithically with one or more of the lower panel and the plurality of spacers such that the walkway module forms a single piece. In some embodiments, the ground has a slope ranging between 1% and 3%. In some embodiments, the walkway module has a longitudinal dimension ranging between 0.8 m and 2 m, a lateral dimension ranging between 0.8 m and 2 m, and a height ranging between 5 cm and 20 cm. The walkway module has a longitudinal-to-lateral dimension ratio ranging between 1 and 2. In some embodiments, the walkway module further includes a soft material layer adhered to a bottom of the lower panel. The soft material layer is in contact with the pre-conditioned ground and is configured to self-level the walkway module. The soft material layer includes plastomers, rubber, thermoplastic elastomers, and combinations of the same. In some embodiments, a total surface area of the plurality of perforations is less than 25% of a surface area of the upper panel. In some embodiments, the walkway module further includes anti-skidding means applied to a top surface of the upper panel. In some embodiments, the walkway further includes a cementitious layer. The cementitious layer is positioned between the pre-conditioned ground and the walkway module. The cementitious layer is adhered to both the ground and the walkway module upon hardening to secure the walkway module to the pre-conditioned ground. In some embodiments, the cementitious layer has a thickness ranging between 2.5 cm and 5 cm.

BRIEF DESCRIPTION OF THE DRAWINGS

So that the manner in which the previously-recited features, aspects, and advantages of the embodiments of this disclosure as well as others that will become apparent are attained and can be understood in detail, a more particular description of the disclosure briefly summarized previously may be had by reference to the embodiments that are illustrated in the drawings that form a part of this specification. However, it is to be noted that the appended drawings illustrate only certain embodiments of the disclosure and are not to be considered limiting of the disclosure's scope as the disclosure may admit to other equally effective embodiments.

FIG. 1 is a top view of a walkway module, according to an embodiment of the disclosure.

FIG. 2A is a longitudinal side view of the walkway module, according to an embodiment of the disclosure. FIG. 2B is a lateral side view of the walkway module, according to an embodiment of the disclosure.

Figure 3A:
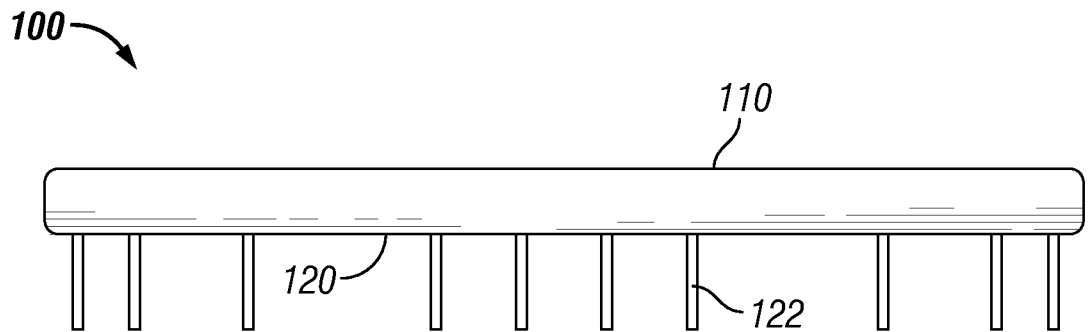
FIG. 3A is a longitudinal side view showing an anchorage mechanism for securing the walkway module to a pre-conditioned ground, according to an embodiment of the disclosure.

In the accompanying Figures, similar components or features, or both, may have a similar reference label.

DETAILED DESCRIPTION

The disclosure refers to particular features, including process or method steps. Those of skill in the art understand that the disclosure is not limited to or by the description of embodiments given in the specification. The subject matter of this disclosure is not restricted except only in the spirit of the specification and appended claims.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

Although the disclosure has been described with respect to certain features, it should be understood that the features and embodiments of the features can be combined with other features and embodiments of those features.

Although the disclosure has been described in detail, it should be understood that various changes, substitutions, and alternations can be made without departing from the principle and scope of the disclosure. Accordingly, the scope of the present disclosure should be determined by the following claims and their appropriate legal equivalents.

As used throughout the disclosure, the singular forms "a," "an," and "the" include plural references unless the context clearly indicates otherwise.

As used throughout the disclosure, the word "about" includes +/−5% of the cited magnitude.

As used throughout the disclosure, the words "comprise," "has," "includes," and all other grammatical variations are each intended to have an open, non-limiting meaning that does not exclude additional elements, components or steps. Embodiments of the present disclosure may suitably "comprise," "consist," or "consist essentially of" the limiting features disclosed, and may be practiced in the absence of a limiting feature not disclosed. For example, it can be recognized by those skilled in the art that certain steps can be combined into a single step.

As used throughout the disclosure, the words "optional" or "optionally" means that the subsequently described event or circumstances can or may not occur. The description includes instances where the event or circumstance occurs and instances where it does not occur.

Where a range of values is provided in the specification or in the appended claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended claims to a method comprising two or more defined steps, the defined steps can be carried out in any order or simultaneously except where the context excludes that possibility.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

As used throughout the disclosure, spatial terms described the relative position of an object or a group of objects relative to another object or group of objects. The spatial relationships apply along vertical and horizontal axes. Orientation and relational words, including "upper," "lower," "top," "bottom," "side," and other like terms, are for descriptive convenience and are not limiting unless otherwise indicated.

As used throughout the disclosure, the term "walkway" refers to a low traffic volume road. Non-limiting examples of a low traffic volume road include sidewalks, walkways, bicycle-only roads, and parking lots. The term "walkway" can be used interchangeably with terms such as paving.

As used throughout the disclosure, the term "soft material" refers to a material that has a hardness less than the material used for any of the upper panel, the lower panel, the side panel, and the spacer.

Embodiments of the disclosure relate to a walkway module that includes two layers of polymeric panels. An upper panel is vertically separated from the lower panel via spacers (or internal supports) such that the walkway module has a hollow interior. In an embodiment, the upper panel is perforated (the lower panel does not have any perforations) such that surface water can be captured in the hollow interior for water runoff purposes. In an embodiment, utility lines can occupy the hollow interior. A plurality of walkway modules can be connected to one another, either laterally or longitudinally, using various connecting mechanisms. The walkway module can be secured to the ground using various anchoring mechanisms. The walkway module can be secured to the ground by placing it on an uncured cementitious layer and subsequently hardening the cementitious layer. The upper panel can include anti-skidding means for preventing pedestrians, cyclists, and motorists from skidding or slipping.

Advantageously, the walkway module replaces asphalt and concrete that are frequently used for paving low traffic volume roads. Advantageously, the walkway module includes recycled materials and is recyclable. Advantageously, the walkway module provides ease of maintenance and reduced maintenance costs. Advantageously, the walkway module is capable of mitigating surface water runoff and placing utility lines. Advantageously, the walkway module can be installed in a fast manner. Advantageously, the walkway module is sustainable and has reduced carbon and water foot prints.

FIG. 1 shows a top view of the walkway module 100, according to an embodiment of the disclosure. The walkway module 100 includes a polymeric material. The polymeric material can include virgin or recycled polymers (including plastic waste), or both. The polymeric material can include thermoplastics or thermosets, or both. Non-limiting examples of the polymeric material include polypropylene, polyethylene (including high-density polyethylene and ultra-high-molecular-weight polyethylene), polycarbonate, polyurethane, ethylene-vinyl acetate, and combinations of the same. Non-limiting examples of the polymeric material also include ethylene/alpha-olefin plastomers with variable molecular weights. The polymeric material can include fibrous materials for reinforcement. Non-limiting examples of fibrous materials include organic fibers, inorganic fibers, and nanofillers. The polymeric material can include ultraviolet absorbers. Non-limiting examples of ultraviolet absorbers include 2-hydroxy-4-(octyloxy)benzophenone and 2-(2-hydroxy-3-tert-butyl-5-methyl-phenyl)-5-chlorobenzotriazole. In some embodiments, the ultraviolet absorber content included in the polymeric material can range between about 1 parts per hundred (phr) and about 2 phr. The polymeric material can include quenchers. Non-limiting examples of quenchers include nickel phenolate and hindered benzoate. In some embodiments, the quencher content included in the polymeric material can range between about 1,500 parts per million (ppm) and about 2,000 ppm. The polymeric material can include hindered amine light stabilizers. Non-limiting examples of hindered amine light stabilizers include high molecular weight aminoether (N—OR). In some embodiments, the hindered amine light stabilizer content included in the polymeric material can range between about 1,500 ppm and about 1,800 ppm. The polymeric material can include antioxidants. Non-limiting examples of antioxidants include hindered phenolic antioxidants such as Alvinox™ 176 (3V Sigma USA Inc., Georgetown, S.C.). In some embodiments, the antioxidant content included in the polymeric material can range between about 0.1 wt. % and about 0.5 wt. %. The polymeric material can include impact modifiers. Non-limiting examples of impact modifiers include ethylene/vinyl acetate/carbon monoxide (EVA/CO) copolymer or plastomer such as Elvaloy® (Entec Polymers, Orlando, Fla.). In some embodiments, the impact modifier content included in the polymeric material can range between about 5 wt. % and about 15 wt. %. The polymeric material can include fatigue and compression set improvement additives. Non-limiting examples of fatigue and compression set improvement additives include talc and copolymer of ethylene and vinyl acetate (CEVA). In some embodiments, the talc content included in the polymeric material can be less than about 10 wt. %. In some embodiments, the CEVA content included in the polymeric material can be less than about 3 wt. %. For outdoor use, the polymeric material is able to withstand up to 80 deg. C. without deformation. This can be achieved by including polyblends having a relatively high heat deflection temperature (HDT) or inhibitors to the polymer composition during the molding process. Non-limiting examples of polyblends include fiber reinforced polypropylene. In some embodiments, the fiber content of the fiber reinforced polypropylene can range between about 20 wt. % and about 40 wt. %. In at least one embodiment, the fiber content of the fiber reinforced polypropylene is about 30 wt. %. One skilled in the art would recognize that such additives can be added to the polymer composition to enhance aging resistance, weather resistance, ductility, impact resistance, and cracking resistance of the polymeric material. An example polymeric material has mechanical properties as shown in Table 1.

TABLE 1

| Material Property | Value |
|---|---|
| Coefficient of Linear Thermal Expansion | 6-14 |
| Shrinkage | 0.015-0.025 inch/inch |
| Hardness Shore D | 70-83 |
| Stiffness (Flexural Modulus) | 1.2-1.6 GPa |
| Compressive strength (rupture or yield) | 24-49 Mpa |
| Strength at Break (Tensile) | 20-40 MPa |
| Strength at Yield (Tensile) | 35-40 MPa |
| Young Modulus | 1.1-1.6 GPa |
| HDT @0.46 MPa (67 psi) | 100-120° C. |
| HDT @1.8 MPa (264 psi) | 50-60° C. |
| Max Continuous Service Temperature | 100-130° C. |
| Min Continuous Service Temperature | −20 to −10° C. |
| Slip Resistance (wet)- ASTM 2047 | 0.62 |

In some embodiments, the walkway module 100 has a longitudinal dimension ranging between about 0.5 m and about 5 m, alternately between about 0.5 m and about 4 m, alternately between about 0.5 m and about 3 m, and alternately between about 0.8 m and about 2 m. In at least one embodiment, the walkway module 100 has a longitudinal dimension of about 1.2 m. In at least one embodiment, the walkway module 100 has a longitudinal dimension of about 2.4 m. In at least one embodiment, the walkway module 100 has a longitudinal dimension of about 3.6 m. In some embodiments, the walkway module 100 has a lateral dimension ranging between about 0.5 m and about 5 m, alternately between about 0.5 m and about 4 m, alternately between about 0.5 m and about 3 m, and alternately between about 0.8 m and about 2 m. In at least one embodiment, the walkway module 100 has a lateral dimension of about 1 m. In at least one embodiment, the walkway module 100 has a lateral dimension of about 2 m. In at least one embodiment, the walkway module 100 has a lateral dimension of about 3 m. One skilled in the relevant art would recognize that the longitudinal and lateral dimensions of the walkway module 100 can vary depending on the dimension requirements of the walkway. In some embodiments, the walkway module 100 has a longitudinal-to-lateral dimension ratio ranging between about 1 and about 5, alternately between about 1 and about 4, alternately between about 1 and about 2. In at least one embodiment, the walkway module 100 has a longitudinal-to-lateral dimension ratio of about 1.2.

In some embodiments, the walkway module 100 has a hollow interior. As shown in FIG. 1, the dashed lines represent positions of spacers 130 that prevent the top planar structure (that is, the upper panel 110) from collapsing. The spacers 130 can have a substantially circular or substantially rectangular shape. One skilled in the art would recognize that the size, number, and position of the spacers 130 can vary depending on the loading requirements of the walkway.

FIG. 2A shows a longitudinal side view of the walkway module 100, according to an embodiment of the disclosure. FIG. 2B shows a lateral side view of the walkway module 100, according to an embodiment of the disclosure. The walkway module 100 includes an upper panel 110 and a lower panel 120. A hollow interior is defined by the upper panel 110 and the lower panel 120. The dashed lines in FIG. 2A represent spacers 130 that prevent the top planar structure from collapsing when pedestrians, cyclists, and motorists are traveling on the top surface of the upper panel 110. In some embodiments, the walkway module 100 includes side panels 140. One or more of the side panels 140 can be placed on any of the four sides of the walkway module 100. In some embodiments, one or more of the longitudinal ends can be open (that is, the side panel 140 does not exist on one or more of the longitudinal ends or the side panel 140 attached to one or more of the longitudinal ends has an opening) to allow water runoff. In at least one embodiment, as shown in FIGS. 2A and 2B, two side panels 140 are attached to and entirely cover the two lateral ends of the walkway module 100 while the two longitudinal ends are open. In some embodiments, the opening of the side panel 140 can have a substantially circular or substantially rectangular shape. The size of the opening can range between about 1 cm and about 10 cm and alternately between about 3 cm and about 8 cm. In at least one embodiment, the size of the opening is about 5 cm. The total surface area of the opening is less than about 50%, alternately less than about 40%, and alternately less than about 25% of the surface area of the side panel 140.

In some embodiments, the walkway module 100 has a height ranging between about 5 cm and about 50 cm, alternately between about 5 cm and about 20 cm, and alternately between about 5 cm and about 20 cm. In at least one embodiment, the walkway module 100 has a height of about 10 cm. In at least one embodiment, the walkway module 100 has a height of about 15 cm. One skilled in the relevant art would recognize that the height of the walkway module 100 can vary depending on the dimension requirements of the walkway.

In some embodiments, each of the upper panel 110, the lower panel 120 and the side panels 140 has a thickness ranging between about 0.5 cm and about 10 cm, alternately between about 1 cm and about 5 cm, and alternately between about 1 cm and about 2 cm. In at least one embodiment, each of the upper panel 110, the lower panel 120 and the side panels 140 has a thickness of about 1.5 cm.

In some embodiments, the upper panel 110 can be molded monolithically with one or more of the spacers 130, one or more of the side panels 140, and the lower panel 120 to form a single piece, standalone walkway module 100. In alternate embodiments, each of the upper panel 110, the lower panel 120, one or more of the spacers 130, and one or more of the side panels 140 can be molded separately and subsequently integrated to form the walkway module 100. In this manner, the upper panel 110 can be removable from the other components 120, 130, 140.

In some embodiments, the walkway module 100 includes a soft material layer 125 adhered to the bottom of the lower panel 120. The soft material layer 125 is in contact with the pre-conditioned ground and are used for self-leveling purposes. Non-limiting examples of materials used for the soft material layer 125 include plastomers, rubber (including recycled rubber), thermoplastic elastomers, and combinations of the same. In some embodiments, the soft material layer 125 is mechanically attached to the lower panel 120. In some embodiments, the lower panel 120 and the soft material layer 125 can be formed by co-extrusion, double injection, or two shot molding.

In some embodiments, the spacers 130 are positioned in a manner not to obstruct the water flow during water runoff. As a non-limiting example, a plurality of spacers 130 can be placed parallel to the longitudinal direction. As shown for example in FIG. 1, the walkway module 100 has four spacers 130 adjacent to the four corners of the substantially rectangular walkway module 100, and two spacers 130 that are located at the lateral midpoint of the substantially rectangular walkway module 100 and are placed parallel to the longitudinal direction of the substantially rectangular walkway module 100. The spacers 130 can be spaced at a distance ranging between about 25 cm to about 60 cm. In alternate embodiments, the spacer 130 can be continuous, that is, the spacer 130 can be in a form of an internal wall parallel to the longitudinal direction.

In some embodiments, the upper panel 110 can have perforations 135 such that water can permeate from the top to the bottom of the upper panel 110 into the hollow space. Each perforation can have a substantially circular or substantially rectangular shape. The lower panel 120 may not have any perforations 135. In this manner, surface water can be collected and drained through the hollow space of the walkway module 100. The size of each perforation 135 can range between about 1 cm and about 10 cm and alternately between about 3 cm and about 8 cm. In at least one embodiment, the size of each perforation 135 is about 5 cm. The total surface area of the perforations 135 is less than about 50%, alternately less than about 40%, and alternately less than about 25% of the surface area of the upper panel 110. One skilled in the art would recognize that the size, number, and position of the perforations 135 may vary depending on the water runoff requirements of the walkway or paving. In alternate embodiments, when water runoff is not a consideration, both the upper panel 110 and the lower panel 120 can have perforations 135 or both can lack such perforations 135. In this manner, utility lines such as cables and pipes can occupy the hollow space of the walkway module 100.

In some embodiments, the top surface of the upper panel 110 can have anti-skidding means to protect the pedestrian, cyclist, and motorist from experiencing undesired skidding when traveling on the walkway module 100. Non-limiting examples of anti-skidding means include traction ridges, friction-enhancing tape, and friction-enhancing chemicals that can be applied on the top surface of the upper panel 110. In some embodiments, the friction-enhancing chemicals can be included in the composition of the thermoplastic used to produce the polymeric walkway module 100.

In some embodiments, the walkway module 100 can be placed on a sloped ground to allow gravitational water runoff. The sloped ground can have a slope ranging between about 0% and about 10%, alternately between about 0.5% and about 5%, and alternately between about 1% and about 3%.

In some embodiments, the pre-conditioned ground where the walkway module is to be secured can include well-graded soil (based on sieve analysis). As used throughout the disclosure, the term "well-graded soil" refers to a soil that contains particles having a size distribution ranging between about No. 4 and about No. 200 sieve. The pre-conditioned ground can inorganic materials (such as silica-based materials). The pre-conditioned ground can have a liquid limit ranging between about 0 and about 35. The pre-conditioned ground can have a plasticity index ranging between about 0 and about 12. As used throughout the disclosure, the term "liquid limit" refers to a unitless quantity related to the water content at which the behavior of a soil changes from a plastic state to a liquid state. The liquid limit can be determined using Casagrande's method or a fall cone test. As used throughout the disclosure, the term "plasticity index" refers to a unitless quantity related to the size of the range of water content where the solid exhibits plastic properties. The plasticity index is defined as the difference between the liquid limit and the plastic limit. As used throughout the disclosure, the term "plastic limit" refers to a unitless quantity related to the moisture content of a rolled thread of a fine portion of a soil where the thread breaks apart at a diameter of about 3.2 millimeters. In alternate embodiments, the ground can include soft soil or sand, or both.

Figure 3B:
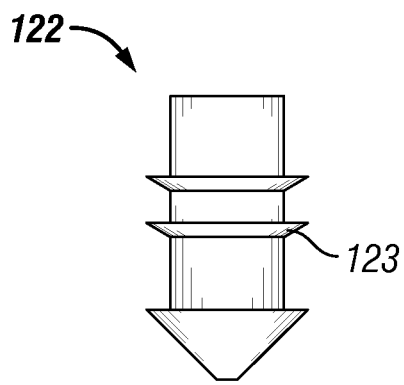
FIG. 3B is a side view of an anchor, according to an embodiment of the disclosure.

FIG. 3A is a longitudinal side view showing an anchorage mechanism for securing the walkway module 100 to a pre-conditioned ground, according to an embodiment of the disclosure. The bottom of the lower panel 120 includes a plurality of anchors 122. The spacing of the anchors 122 can range between about 10 cm and about 25 cm. One skilled in the art would recognize that the spacing of the anchors 122 can vary depending on the loading requirements of the walkway module 100. FIG. 3B is a side view of an anchor 122, according to an embodiment of the disclosure. As shown in FIG. 3B, the anchor 122 has one or more staggered features 123 that are located radially on the cylindrical surface of the anchor 122. The staggered features 123 allow the walkway module 100 to be secured to the ground with ease but makes the walkway module 100 difficult to remove from the ground. The length of the anchor 122 can range between about 15 cm and about 25 cm. One skilled in the art would recognize that the length of the anchors 122 can vary depending on the material properties of the pre-conditioned ground.

Figure 4:
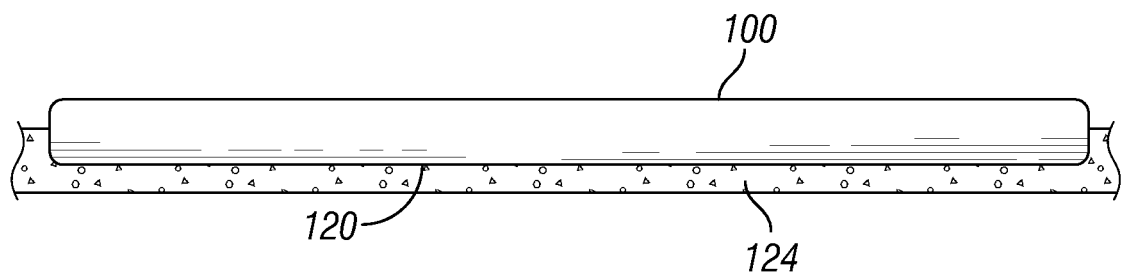
FIG. 4 is a longitudinal side view showing an anchorage mechanism for securing the walkway module to a pre-conditioned ground, according to an embodiment of the disclosure.

FIG. 4 is a longitudinal side view showing an anchorage mechanism for securing the walkway module 100 to a pre-conditioned ground, according to an embodiment of the disclosure. A cementitious layer 124 is applied on the pre-conditioned ground. The cementitious layer 124 can include cementitious materials such as hydraulic cement (for example, Portland cement). The pre-conditioned ground can be a non-plastic ground. The pre-conditioned ground can have a plasticity index of less than about 7, alternately less than about 3, and alternately less than about 1. The thickness of the cementitious layer 124 can range between about 1 cm and about 10 cm, alternately between about 2 cm and about 7 cm, and alternately between about 2.5 cm and about 5 cm. The walkway module 100 is placed on the cementitious layer 124 while the cementitious layer 124 is still plastic. The bottom of the lower panel 120 is in contact with the cementitious layer 124. In some embodiments, a portion of one or more of the side panels 140 can be in contact with the cementitious layer 124. After the walkway module 100 is placed on the cementitious layer 124, the cementitious layer 124 is allowed to harden such that the cementitious layer 124 adheres to both the pre-conditioned ground and the walkway module 100.

Figure 5:
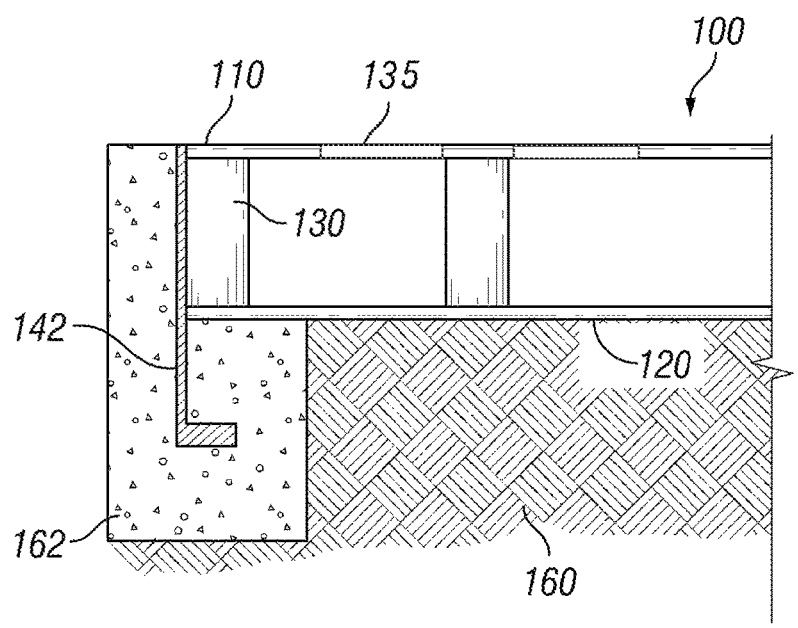
FIG. 5 is a cross-sectional lateral side view showing a portion of the walkway module, according to an embodiment of the disclosure.

FIG. 5 is a cross-sectional lateral side view showing a portion of the walkway module 100, according to an embodiment of the disclosure. The walkway module 100 is secured to the pre-conditioned ground 160 using an L-shaped notch 142. The L-shaped notch 142 is attached to the longitudinal side of the walkway module 100. Before the walkway module 100 is placed onto the pre-conditioned ground 160, a square or cylindrical pocket 162 is dug or drilled into the pre-conditioned ground 160. The pocket 162 is filled with cementitious material up to the surface of the pre-conditioned ground 160. The walkway module 100 is placed onto the pre-conditioned ground 160 while the cementitious material in the pocket 162 is still plastic such that the lower panel 120 of the walkway module 100 is in contact with both the cementitious material and the pre-conditioned ground 160. Additional cementitious material can be added to the side of the placed walkway module 100. Subsequently, the cementitious material is allowed to harden such that the walkway module 100 is secured to the pre-conditioned ground via the L-shaped notch 142. The resulting concrete block serves as a curb having a recess to hold and level the walkway module 100.

Figure 6A:
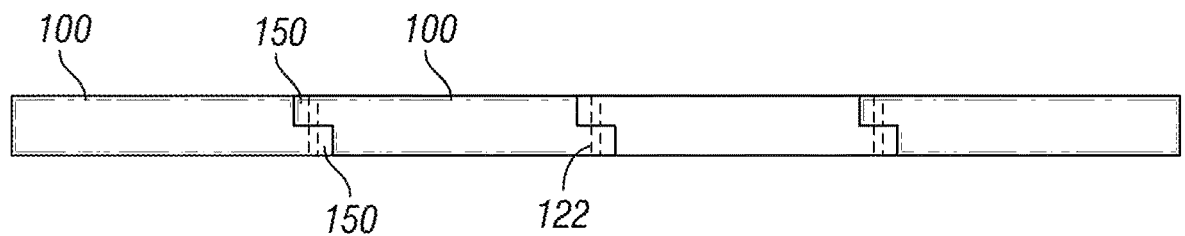
FIG. 6A is a cross-sectional side view of a series of walkway modules interconnected to one another, according to an embodiment of the disclosure.
Figure 6B:
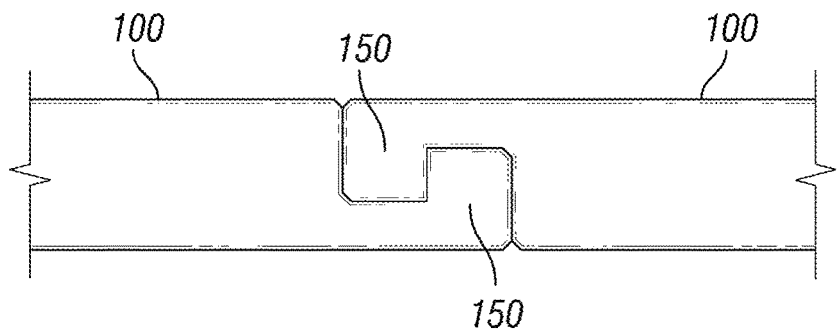
FIG. 6B is a cross-sectional side view of a series of walkway modules interconnected to one another, according to an embodiment of the disclosure.
Figure 6C:
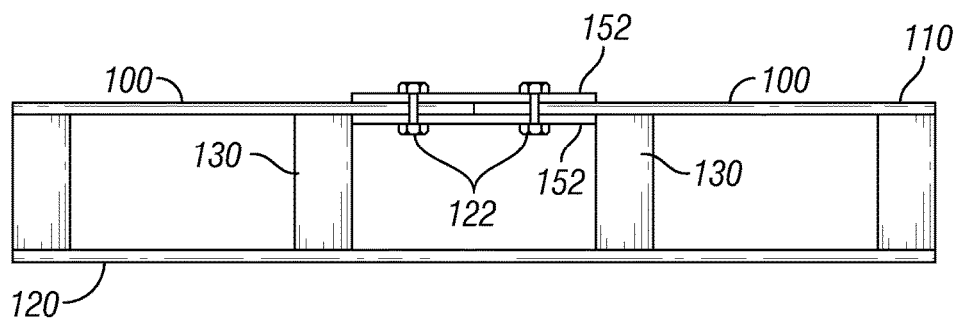
FIG. 6C is a cross-sectional side view of a series of walkway modules interconnected to one another, according to an embodiment of the disclosure.

FIGS. 6A, 6B, and 6C show cross-sectional side views of a series of walkway modules 100 interconnected to one another, according to an embodiment of the disclosure. A plurality of walkway modules can be interconnected either longitudinally or laterally, or both, depending on the required dimensions of the walkway to be constructed. As shown in FIG. 6A, two adjacent walkway modules 100 can have corresponding protrusions 150 on the sides that can be vertically overlapped against one another. Each of the protrusions 150 has corresponding through holes such that an anchor 122 can be inserted to connect the two adjacent walkway modules 100. As shown in FIG. 6B, two adjacent walkway modules 100 can have corresponding mating elements 150 on the sides that can be vertically overlapped against one another to connect the two adjacent walkway modules 100. As shown in FIG. 6C, two adjacent walkway modules 100 can be interconnected by vertically placing two connection plates 152 onto two adjacent upper panels 110 such that the interface of the two adjacent upper panels 110 is covered by the two connection plates 152. The two connection plates 152 and the two upper panels 110 are secured using various securing means 122 such as a screw or bolt-nut system. One of the two connection plates 152 is placed vertically on top of the two upper panels 110 and the other of the two connection plates 152 is placed vertically underneath the two upper panels 110.

Figure 7A:
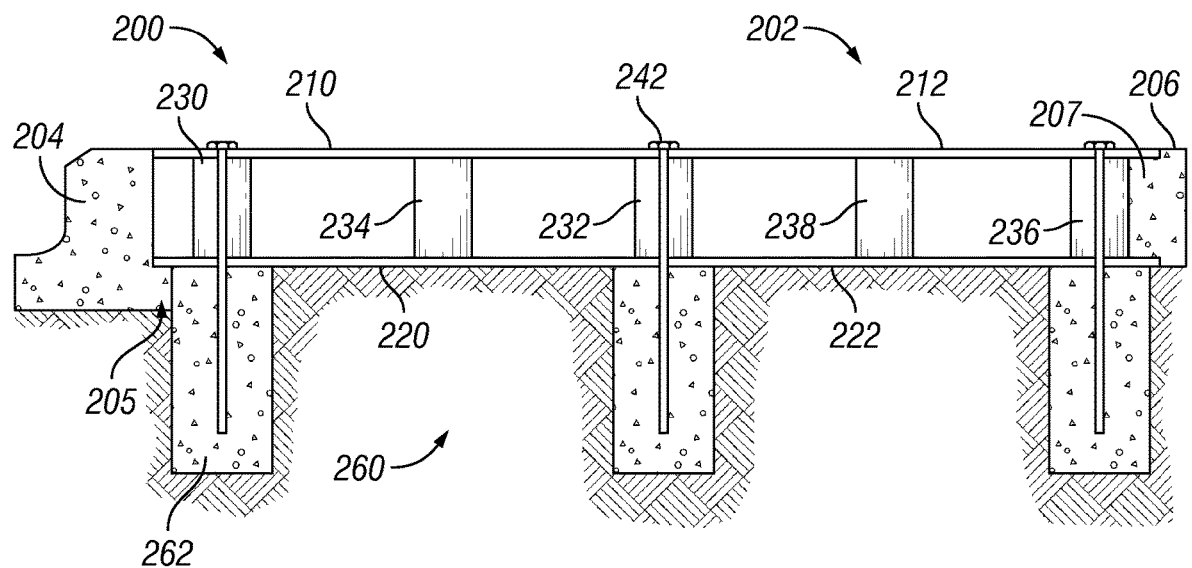
FIG. 7A is a cross-sectional lateral side view of an example walkway, according to an embodiment of the disclosure.

FIG. 7A is a cross-sectional lateral side view of an example walkway, according to an embodiment of the disclosure. Two walkway modules 200, 202 are laterally connected to one another and anchored to the ground. The upper panel 210, 212 of each walkway module 200, 202 has a thickness ranging between about 1 cm and about 1.5 cm. In some embodiments, the upper panels 210, 212 include anti-skidding tape (not shown) applied to the top surfaces of each upper panel 210, 212. The anti-skidding tape can have a width of about 10 cm and a length substantially equal to the longitudinal dimension of the upper panels 210, 212. The anti-skidding tape can be applied every 30 cm laterally from the adjacent position. In some embodiments, the top surfaces of each upper panel 210, 212 include a molded surface including round or rectangular vertical protrusions (not shown) to create grip. In some embodiments, an elastomeric mat (which can be constructed of recycled rubber) having a high friction coefficient can be secured on the top surfaces of the upper panels 210, 212.

The lower panel 220, 222 of each walkway module 200, 202 has a thickness ranging between about 1 cm and about 1.5 cm. The spacers 230, 232, 234, 236, 238 have a lateral or longitudinal size, or a diameter of about 12 cm and a height of about 15 cm. A concrete curb 204 is positioned at one lateral end of the walkway module 200. The concrete curb 204 has a vertical recess 205 to hold and level the walkway module 200. A concrete edge piece 206 is positioned at the opposite lateral end of the walkway module 202. The concrete edge piece 206 has a vertical protrusion 207 that fits between the upper panel 212 and the lower panel 222.

Figure 7B:
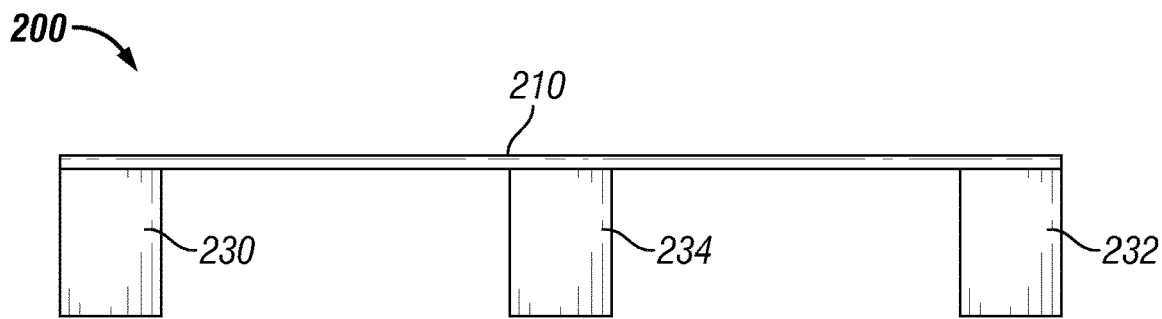
FIG. 7B is a cross-sectional lateral side view showing a portion of the walkway module, according to an embodiment of the disclosure.
Figure 7C:
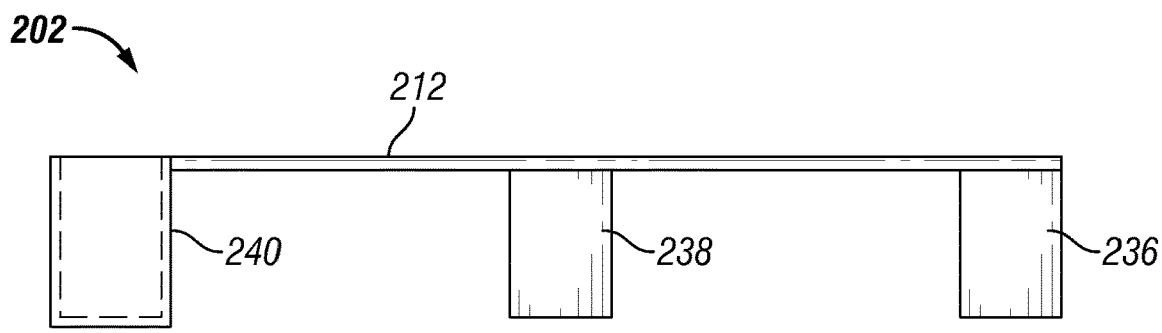
FIG. 7C is a cross-sectional lateral side view showing a portion of the walkway module, according to an embodiment of the disclosure.

FIG. 7B is a cross-sectional lateral side view showing a portion of the walkway module 200, according to an embodiment of the disclosure. One or more spacers 230, 232 are positioned approximately at each of the lateral ends of the upper panel 210. One or more spacers 234 are positioned approximately at the lateral midpoint of the upper panel 210. FIG. 7C is a cross-sectional lateral side view showing a portion of the walkway module 202, according to an embodiment of the disclosure. One or more spacers 236 are positioned approximately at one lateral end of the upper panel 212. One or more spacers 238 are positioned approximately at the lateral midpoint of the walkway module 202.

A slot 240 having a hollow space is positioned approximately at the other lateral end of the upper panel 212. The slot 240 has internal dimensions corresponding to the spacer 232 of the other walkway module 200 such that the spacer 232 can be inserted into the hollow space of the slot 240. In this manner, the two walkway modules 200, 202 can be laterally connected to one another using a common anchor 242.

Figure 7D:
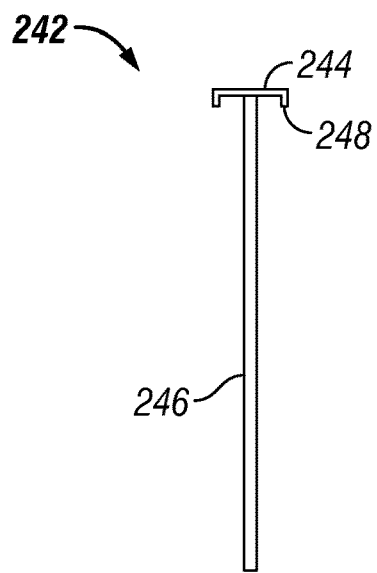
FIG. 7D is a cross-sectional side view of the anchor, according to an embodiment of the disclosure.

FIG. 7D is a cross-sectional side view of the anchor 242, according to an embodiment of the disclosure. The anchor 242 has a length of about 40 cm. The anchor 242 includes a head 244 and a body 246. The body 246 is substantially cylindrical and has a diameter of about 5 cm. In some embodiments, the body 246 is constructed of a glass fiber reinforced plastic (GRP) pipe. The head 244 has a thickness of about 0.2 cm and a diameter of about 10 cm. In some embodiments, the head 244 includes a cylindrical protrusion 248 that can be about 2.5 cm deep. Each of the top panels 210, 212 have corresponding circular grooves (not shown) that accepts such cylindrical protrusions 248.

Referring back to FIG. 7A, the walkway modules 200, 202 are secured to the pre-conditioned ground 260 using a plurality of anchors 242. Before the walkway modules 200, 202 are placed onto the pre-conditioned ground 260, a plurality of square or cylindrical pockets 262 are dug or drilled into the pre-conditioned ground 260 at corresponding lateral and longitudinal positions of spacers 230, 232, 236. The upper panels 210, 212 and the lower panels 220, 222 have through holes at corresponding lateral and longitudinal positions of spacers 230, 232, 236. The spacers 230, 232, 236 have through holes at the center positions. In some embodiments, the square or cylindrical pockets 262 have a lateral dimension of about 15 cm and a depth of about 30 cm. The pockets 262 are filled with cementitious material up to the surface of the pre-conditioned ground 260. The walkway modules 200, 202 are placed onto the pre-conditioned ground 260. While the cementitious material in the pockets 262 are still plastic, the anchors 242 are inserted through each of the through holes of upper panels 210, 212, the lower panels 220, 222, and the spacers 230, 232, 236 into each of the pockets 262. Subsequently, the cementitious material is allowed to harden such that the walkway modules 200, 202 are secured to the pre-conditioned ground via the anchors 242.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method for constructing a walkway for mitigating surface water runoff, the method comprising the steps of:

conditioning a ground serving as a base where a walkway module is to be secured, wherein the ground is a well-graded soil; and securing the walkway module to the ground, wherein the walkway module comprises:

an upper panel, the upper panel being substantially rectangular and comprising a plurality of perforations;

a lower panel, the lower panel having dimensions substantially similar to the upper panel and placed vertically above and in parallel with the upper panel, where the lower panel is free of perforations; and a plurality of spacers, the plurality of spacers positioned between the upper panel and the lower panel such that a hollow space is defined, wherein the perforations extend from a top surface to a bottom surface of the upper panel and are in fluid communication with the hollow space so that surface water exterior of the walkway model permeates through the plurality of perforations and occupies the hollow space, wherein the plurality of spacers is positioned parallel to a longitudinal direction of the walkway module such that water flow is not obstructed during the surface water runoff, and wherein the walkway module further comprises one or more side panels, the one or more side panels placed on any of four outermost sides of the walkway module, oriented perpendicular to the upper panel and the lower panel and extending from the upper panel to the lower panel.

2. The method of claim 1, wherein the upper panel is molded monolithically with one or more of the lower panel and the plurality of spacers such that the walkway module forms a single piece.

3. The method of claim 1, wherein the ground has a slope ranging between 1% and 3%.

4. The method of claim 1, wherein the walkway module has a longitudinal dimension ranging between 0.8 m and 2 m, a lateral dimension ranging between 0.8 m and 2 m, and a height ranging between 5 cm and 20 cm.

5. The method of claim 1, wherein the walkway module has a longitudinal-to-lateral dimension ratio ranging between 1 and 2.

6. The method of claim 1, wherein a total surface area of the plurality of perforations is less than 25% of a surface area of the upper panel.

7. The method of claim 1, wherein the walkway module further comprises anti-skidding means applied to a top surface of the upper panel.

8. The method of claim 1, wherein the walkway module comprises a polymer selected from the group consisting of: polypropylene, polyethylene, polycarbonate, polyurethane, ethylene-vinyl acetate, and combinations of the same.

9. The method of claim 8, wherein the polymer is selected from the group consisting of: virgin polymers, recycled polymers, and combinations of the same.

10. The method of claim 1, wherein the walkway module further comprises a soft material layer adhered to a bottom of the lower panel, wherein the soft material layer is in contact with the ground and is configured to self-level the walkway module.

11. The method of claim 10, wherein the soft material layer includes a material selected from the group consisting of: plastomers, rubber, thermoplastic elastomers, and combinations of the same.

12. The method of claim 1, wherein the securing step includes the steps of:

applying a cementitious layer on the ground;

placing the walkway module on the cementitious layer while the cementitious layer is plastic; and allowing the cementitious layer to harden such that the cementitious layer adheres to both the ground and the walkway module.

13. The method of claim 12, wherein the cementitious layer has a thickness ranging between 2.5 cm and 5 cm.

14. A walkway for mitigating surface water runoff, the walkway comprising:

a pre-conditioned ground, the pre-conditioned ground serving as a base where a walkway module is to be secured onto, wherein the pre-conditioned ground is a well-graded soil; and a walkway module, the walkway module secured to the pre-conditioned ground, wherein the walkway module comprises:

an upper panel, the upper panel being substantially rectangular and comprising a plurality of perforations;

a lower panel, the lower panel having dimensions substantially similar to the upper panel and placed vertically above and in parallel with the upper panel, where the lower panel is free of perforations; and a plurality of spacers, the plurality of spacers positioned between the upper panel and the lower panel such that a hollow space is defined, wherein surface water exterior of the walkway model permeates through the plurality of perforations and occupies the hollow space, where the perforations extend from a top surface to a bottom surface of the upper panel and are in fluid communication with the hollow space, wherein the plurality of spacers is positioned parallel to a longitudinal direction of the walkway module such that water flow is not obstructed during the surface water runoff, wherein the walkway module further comprises one or more side panels, the one or more side panels placed on any of four outermost sides of the walkway module, oriented perpendicular to the upper panel and the lower panel and extending from the upper panel to the lower panel, and wherein the walkway module comprises a polymer selected from the group consisting of: polypropylene, polyethylene, polycarbonate, polyurethane, ethylene-vinyl acetate, and combinations of the same.

15. The walkway of claim 14, wherein the polymer is selected from the group consisting of: virgin polymers, recycled polymers, and combinations of the same.

16. The walkway of claim 14, wherein the upper panel is molded monolithically with one or more of the lower panel and the plurality of spacers such that the walkway module forms a single piece.

17. The walkway of claim 14, wherein the pre-conditioned ground has a slope ranging between 1% and 3%.

18. The walkway of claim 14, wherein the walkway module has a longitudinal dimension ranging between 0.8 m and 2 m, a lateral dimension ranging between 0.8 m and 2 m, and a height ranging between 5 cm and 20 cm, wherein the walkway module has a longitudinal-to-lateral dimension ratio ranging between 1 and 2.

19. The walkway of claim 14, wherein the walkway module further comprises a soft material layer adhered to a bottom of the lower panel, wherein the soft material layer is in contact with the pre-conditioned ground and is configured to self-level the walkway module, wherein the soft material layer includes a material selected from the group consisting of: plastomers, rubber, thermoplastic elastomers, and combinations of the same.

20. The walkway of claim 14, wherein a total surface area of the plurality of perforations is less than 25% of a surface area of the upper panel.

21. The walkway of claim 14, wherein the walkway module further comprises anti-skidding means applied to a top surface of the upper panel.

22. The walkway of claim 14, further comprising:
a cementitious layer, the cementitious layer positioned between the pre-conditioned ground and the walkway module,
wherein the cementitious layer is adhered to both the pre-conditioned ground and the walkway module upon hardening to secure the walkway module to the pre-conditioned ground.

23. The walkway of claim 22, wherein the cementitious layer has a thickness ranging between 2.5 cm and 5 cm.

24. A method for constructing a walkway for mitigating surface water runoff, the method comprising the steps of:
conditioning a ground serving as a base where a walkway module is to be secured, wherein the ground is a well-graded soil; and
securing the walkway module to the ground with an anchor that extends from a top surface of an upper panel past a bottom surface of a lower panel,
wherein the walkway module comprises:
the upper panel, the upper panel being substantially rectangular and comprising a plurality of perforations;
the lower panel, the lower panel having dimensions substantially similar to the upper panel and placed vertically above and in parallel with the upper panel; and
a plurality of spacers, the plurality of spacers positioned between the upper panel and the lower panel such that a hollow space is defined,
wherein the perforations extend from the top surface to a bottom surface of the upper panel and are in fluid communication with the hollow space so that surface water exterior of the walkway model permeates through the plurality of perforations and occupies the hollow space,
wherein the plurality of spacers is positioned parallel to a longitudinal direction of the walkway module such that water flow is not obstructed during the surface water runoff,
wherein the upper panel is molded monolithically with one or more of the lower panel and the plurality of spacers such that the walkway module forms a single piece.

* * * * *